US006789807B2

(12) United States Patent
Morrison et al.

(10) Patent No.: US 6,789,807 B2
(45) Date of Patent: Sep. 14, 2004

(54) CARRYING CART FOR TROLLING MOTOR AND BATTERY

(76) Inventors: Don H. Morrison, 5441 W. Paulding Rd., Monee, IL (US) 60449; Scott Douglas Morrison, 8825 Willow Terrace Dr., Apt. 2206, Orland Hills, IL (US) 60477

( * ) Notice: Subject to any disclaimer, the term of this patent is extended or adjusted under 35 U.S.C. 154(b) by 62 days.

(21) Appl. No.: 10/241,037

(22) Filed: Sep. 12, 2002

(65) Prior Publication Data
US 2004/0051266 A1 Mar. 18, 2004

(51) Int. Cl.$^7$ .............................................. B62B 1/00
(52) U.S. Cl. ........................... 280/47.19; 280/47.26; 280/DIG. 2
(58) Field of Search .................. 280/47.19, DIG. 2, 280/47.23, 47.26, 47.24, 47.27, 47.28, 47.29, 47.34, 47.35, 79.3, 79.6, DIG. 6; 248/98, 129; D34/24, 26, 17, 27, 25

(56) References Cited

U.S. PATENT DOCUMENTS

| 2,484,227 | A | * | 10/1949 | Houk et al. .................. 280/35 |
| 2,487,441 | A | * | 11/1949 | Heilbronn ................ 280/47.19 |
| 2,515,428 | A | * | 7/1950 | Scott et al. .................. 206/319 |
| D166,953 | S | * | 6/1952 | Clarke ........................ D34/15 |
| 2,686,028 | A | * | 8/1954 | Johnson ..................... 248/643 |
| 2,745,673 | A | * | 5/1956 | Koepke et al. ............... 280/40 |
| 2,903,147 | A | * | 9/1959 | Davis, Jr. ................... 414/490 |
| 3,100,048 | A | * | 8/1963 | Halverson ..................... 211/2 |
| 3,224,595 | A | * | 12/1965 | Roy ............................ 211/83 |
| 4,350,366 | A | * | 9/1982 | Helms ........................ 280/655 |
| 4,452,468 | A | * | 6/1984 | Eads et al. .................. 280/641 |
| 4,570,960 | A | * | 2/1986 | Peetz .................... 280/47.131 |
| D321,773 | S | * | 11/1991 | Chiang ........................ D34/17 |
| 5,193,842 | A | * | 3/1993 | Fontenot ..................... 280/645 |
| D351,700 | S | * | 10/1994 | Uzelman ...................... D34/5 |
| 5,453,030 | A | * | 9/1995 | Broussard ..................... 440/6 |
| D396,924 | S | * | 8/1998 | Cardenas .................... D34/24 |
| D446,621 | S | * | 8/2001 | Schier ........................ D34/24 |
| 6,523,838 | B2 | * | 2/2003 | Richardson, IV ........ 280/47.24 |

FOREIGN PATENT DOCUMENTS

| GB | 2100593 | * | 1/1983 |
| GB | 2133977 | * | 8/1984 |

* cited by examiner

Primary Examiner—Bryan Fischmann
(74) Attorney, Agent, or Firm—Ernest Kettelson

(57) ABSTRACT

This invention relates to the field of carts on wheels to make it easier to carry a trolling motor and battery to operate the trolling motor from a store to the customer's boat at a pier. A compartment for the battery is provided at the lower part of the cart above and adjacent to the wheels and a receiving recess for the cylindrical motor housing is provided at the lower part of the cart just forward of the battery compartment. When the cart is pivoted rearwardly on the wheels, the battery compartment and battery thereon is above the wheels and rotated slightly to the rear thereof and the receiving recess for the motor housing and motor thereon is above the wheels and rotated slightly to the front thereof for relatively uniform distribution of the weight of those items to better balance the carrying weight.

12 Claims, 4 Drawing Sheets

CARRYING CART FOR TROLLING MOTOR AND BATTERY

FIELD OF THE INVENTION

This invention relates to the field of carts on wheels to make it easier to carry an item such as trolling motors.

BACKGROUND OF THE INVENTION

Trolling motors and batteries to operate them are commonly available for rent at fishing establishments, marinas and the like. The attendants on duty had to physically carry the motors and batteries from the rental office to the customer's boat at the dock. Both the trolling motor and battery are heavy and cumbersome to carry in accordance with the prior art practice. This made it impractical if not impossible to hire women and younger people as attendants at such rental places. The carrying cart in accordance with the present invention provides a specific place for carrying each component of the trolling motor as well as the battery, thereby making it possible for women and young people to serve as attendants at rental places for rental of trolling motors, batteries and other equipment. Prior art devices for carrying relatively heavy sports equipment of which the inventor is aware include those disclosed in the following United States patents, copies of which are readily available in libraries of a number of the major cities as well as in the United States Patent and Trademark Office itself for those having an interest in examining the state of the prior art prior to this invention:

U.S. Pat. No. 5,566,960;
U.S. Pat. No. 3,100,048;
U.S. Pat. No. 3,059,784;
U.S. Pat. No. 3,041,084;
U.S. Pat. No. 2,983,520;
U.S. Pat. No. 2,903,147;
U.S. Pat. No. 2,901,261;
U.S. Pat. No. 2,892,555;
U.S. Pat. No. 2,884,257;
U.S. Pat. No. 2,843,393;
U.S. Pat. No. 2,817,436;
U.S. Pat. No. 2,721,085;
U.S. Pat. No. 2,595,484;
U.S. Pat. No. 1,747,600.

SUMMARY OF THE INVENTION

The carrying cart in accordance with the present invention provides a separate compartment for the battery needed to power a trolling motor, located in the lower portion of the cart to avoid having to lift a heavy battery very high and in a place that most people are able to place the battery. It also provides a receiving recess for the cylindrical motor housing at the lower portion of the cart that has an arcuate configuration corresponding to that of the motor housing for easy placement of the lower part of the trolling motor in such receiving recess after which the upper motor control portion of the trolling motor as well as its transom mounting mechanism can be pivoted upwardly into registration with a corresponding mounting member of the carrying cart without having to lift the entire weight of the trolling motor to secure the transom mounting mechanism to the mounting member of the carrying cart, the upper motor control part of the trolling motor being then supported above the transom type mounting member of the carrying cart when the transom mounting mechanism has been secured thereto. The carrying cart in accordance with this invention is constructed to also be well balanced when the trolling motor has been received thereon, by placing the heavier portions of the trolling motor and battery near the bottom of the carrying cart and just slightly forward of the wheels. When the carrying cart is pivoted rearwardly, the weight of the battery and cylindrical motor housing is pivoted rearwardly a distance that places their combined weight over the axle between the wheels substantially in balance so there is a minimum tendency to tip forwardly or rearwardly when the cart with motor and battery thereon has been pivoted rearwardly for pushing forward to the designated location.

DESCRIPTION OF PREFERRED EMBODIMENT

Figure 1:
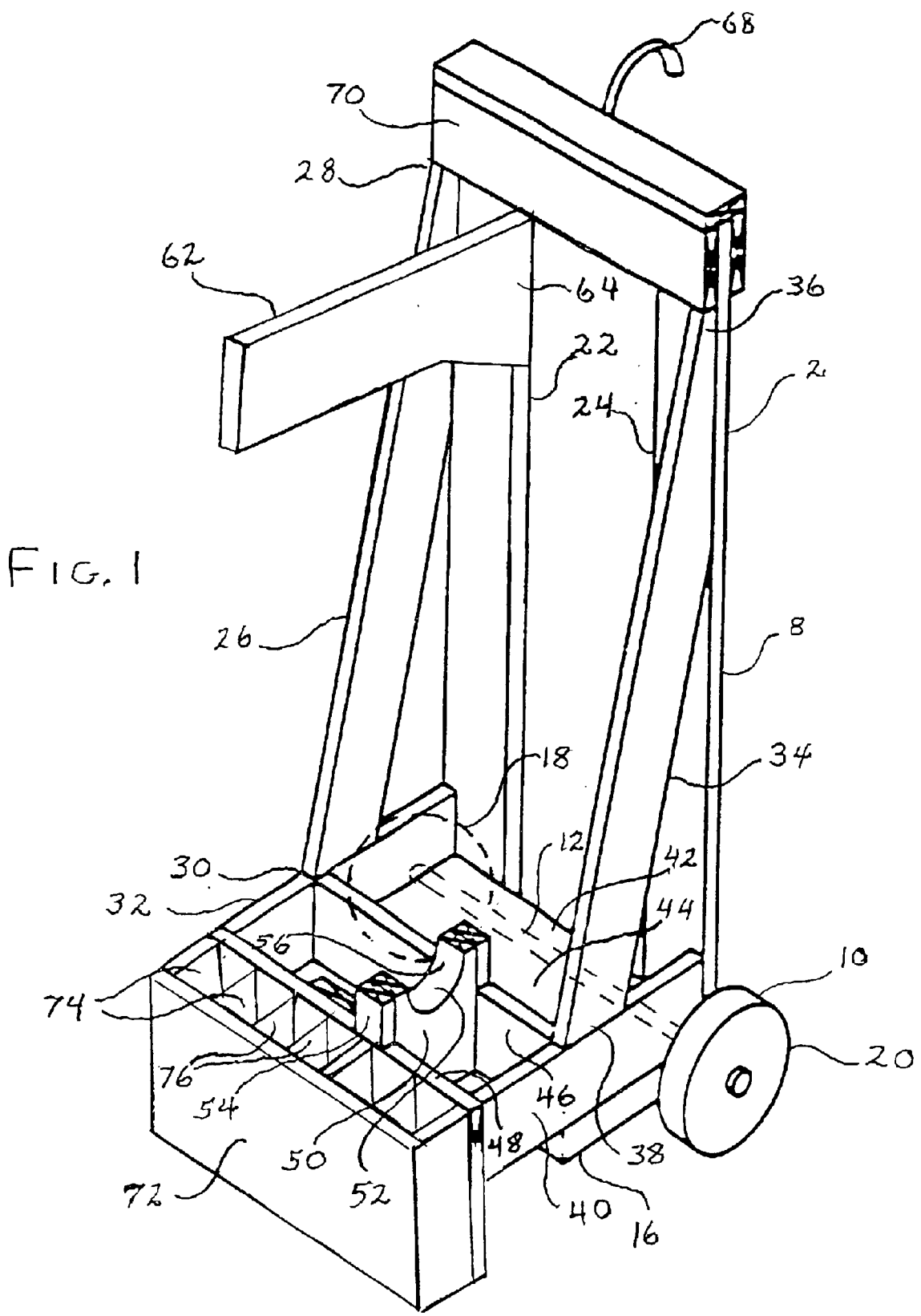
FIG. 1 is a perspective view of a carrying cart for a trolling motor and battery in accordance with this invention.
Figure 2:
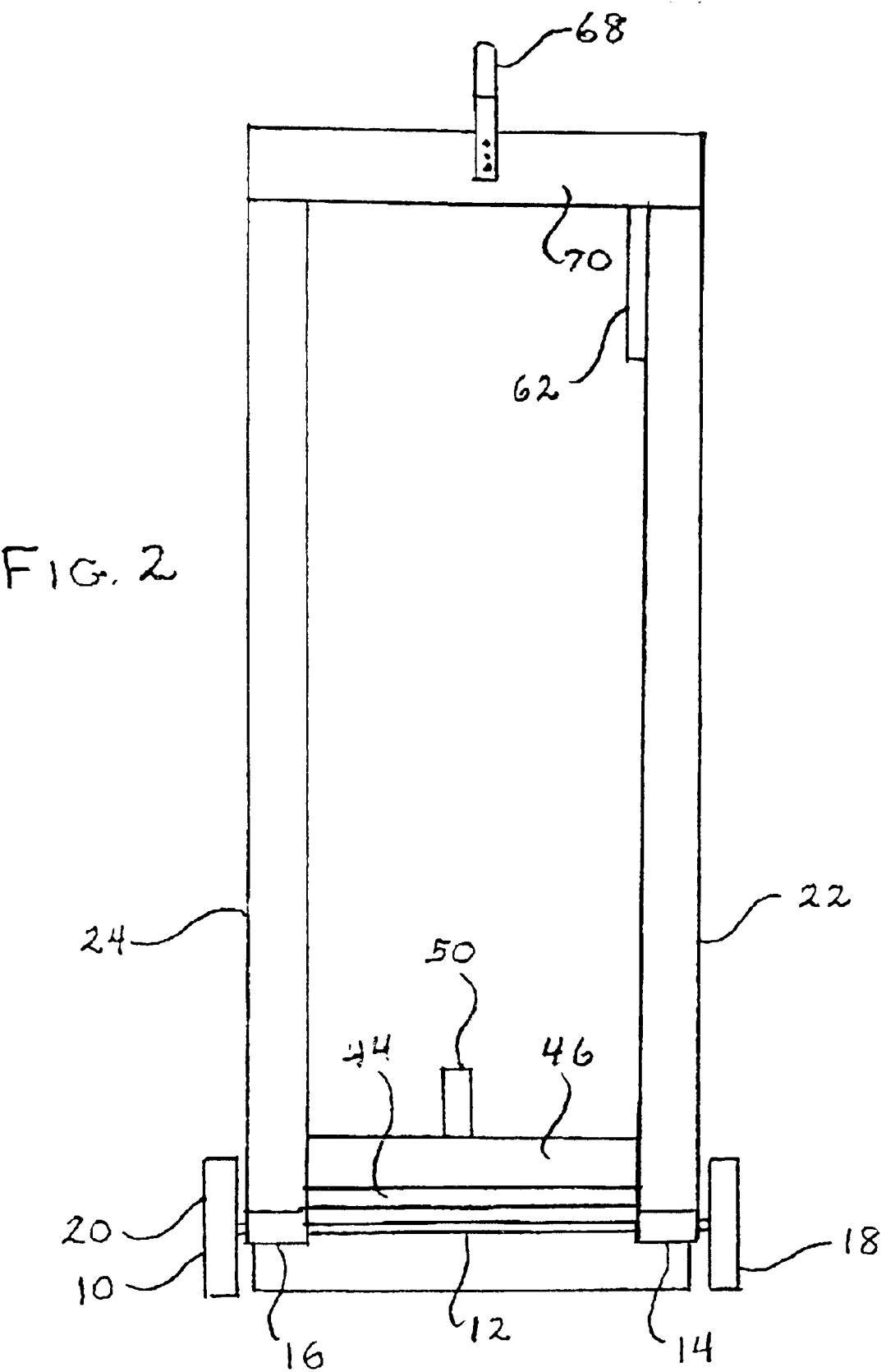
FIG. 2 is an elevation view from the rear of a carrying cart for a trolling motor and battery in accordance with this invention.
Figure 3:
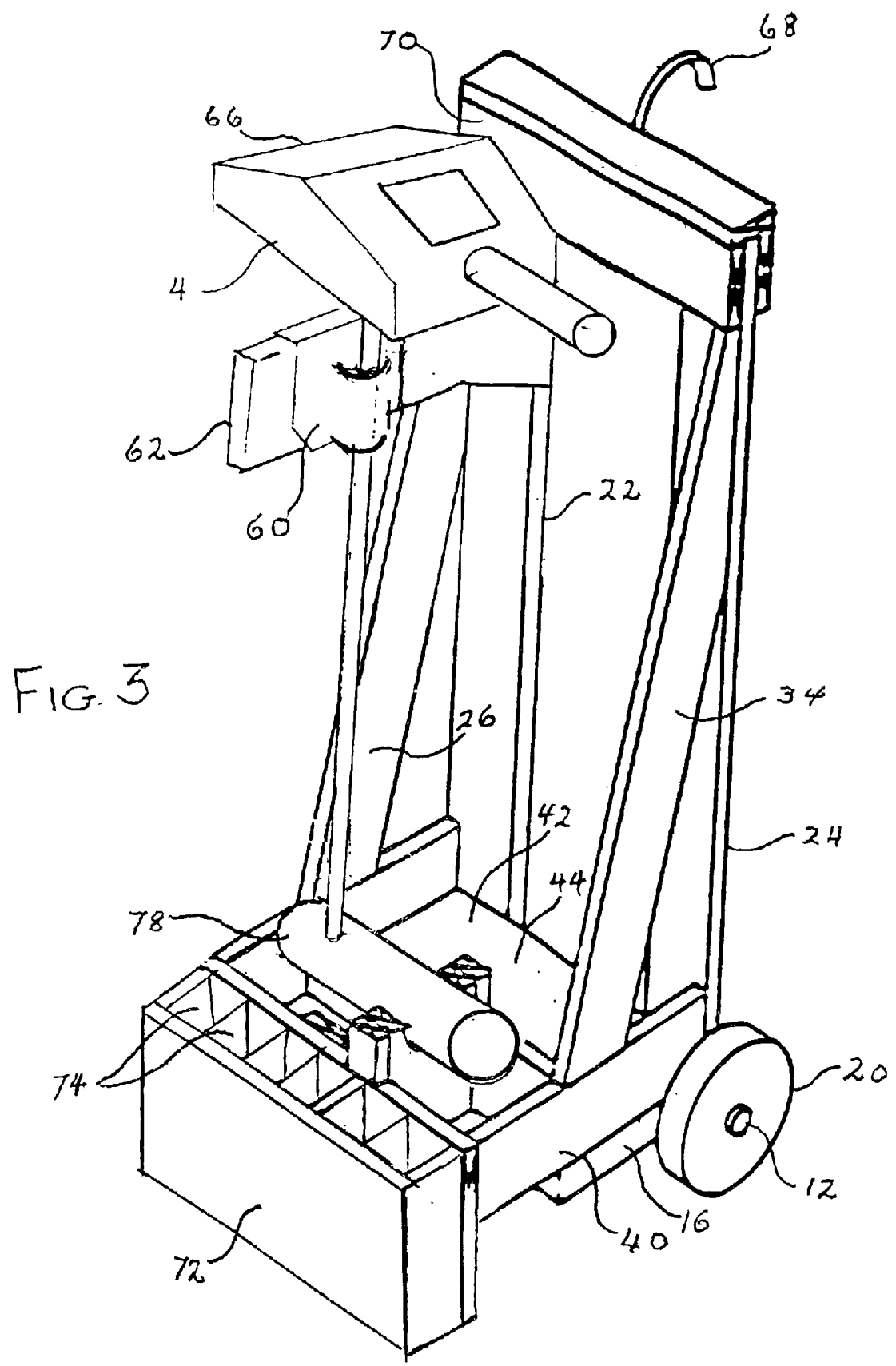
FIG. 3 is a perspective view of a carrying cart for a trolling motor and battery in accordance with this invention having a trolling motor received thereon.
Figure 4:
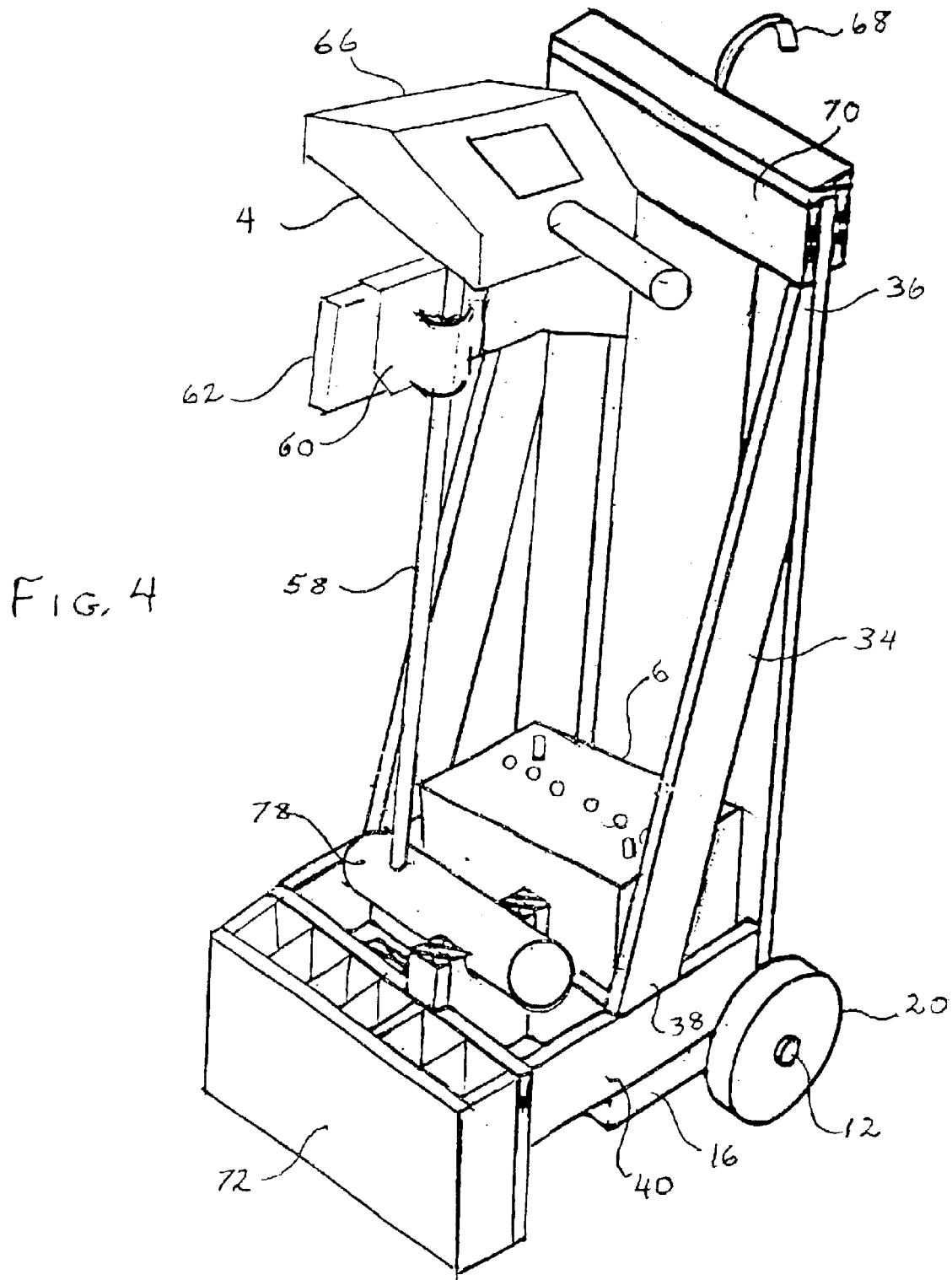
FIG. 4 is a perspective view of a carrying cart for a trolling motor and battery in accordance with this invention having a battery as well as a trolling motor received thereon.

A carrying cart 2 for a trolling motor 4 and battery 6 in accordance with the present invention comprises an upright frame 8 mounted on a wheel assembly 10 that has an axle 12 extending laterally through a first longitudinally extending bottom support member 14 and also through a spaced apart second longitudinally extending bottom support member 16, a first wheel 18 on one side of the axle 12 and a second wheel 20 on the opposite side of the axle 12.

The frame 8 includes a first elongated frame member 22 extending upright from the first bottom support member 14 and a spaced apart second elongated frame member 24 extending upright from the said second bottom support member 16. A first diagonally extending reinforcing frame member 26 is secured at its upper end 28 to an upper portion of the first elongated frame member 22 and at its lower end 30 to a first elongated longitudinally extending side frame member 32. A second diagonally extending reinforcing frame member 34 is secured at its upper end 36 to an upper portion of the second elongated frame member 24 and at its lower end 38 to a second elongated longitudinally extending side frame member 40.

A battery carrying compartment 42 is provided at the rear of the frame 8, having a rectangular floor 44 with one side end resting on the first longitudinally extending bottom support member 14 and its opposite side end resting on the second longitudinally extending bottom support member 16. The first elongated longitudinally extending side frame member 32 forms a side wall for one side of the battery carrying compartment 42, and the second elongated longitudinally extending side frame member 40 forms a side wall for the opposite side of the battery carrying compartment 42. A first cross member 46 is provided to form the front wall of the battery carrying compartment 42, the cross member 46 extending laterally across from the first elongated longitudinally extending side frame member 32 to the second longitudinally extending side frame member 40.

A second cross member 48 is spaced apart forwardly of the first cross member 46, the second cross member also extending laterally across from the first elongated longitudinally extending side frame member 32 to the second longitudinally extending side frame member 40. A trolling motor support member 50 is supported between and above the spaced apart cross members 46 and 48 at a location midway between the side frame members 32 and 40. The trolling motor support member 50 includes an arcuate cut-out portion 52 between its forward end 54 and its rearward end 56. The arcuate cut-out 52 has an arcuate configuration and dimension corresponding to that of one semi-cylindrical side of a substantially cylindrical trolling motor 4 for seating therein when the upright control housing 58 of the trolling motor extends upwardly for securing the housing 58 and the transom clamp members 60 to a forwardly projecting clamp supporting member 62 of the frame 8. The clamp supporting member 62 has its rearward end 64 secured to the first elongated frame member 22 that extends upright from the first bottom support member 14. The motor control assembly 66 extends upwardly from the clamp members 60 when clamped to the clamp supporting member 62.

The first elongated frame member 22 that extends upright from the first bottom support member 14 extends laterally and inwardly of the rear edge of the floor 44 of the battery carrying compartment 42 in one direction and the spaced apart second elongated frame member 24 extending upright from the second bottom support member 16 extends laterally and inwardly of the rear edge of the floor 44 in the opposite direction, that is, toward the first elongated frame member 22. The laterally and inwardly extending portions of the frame members 22 and 24 provide a partial rear wall for the battery carrying compartment 42 facing respective portions of a battery 6 when received in the compartment 42 to prevent the battery 6 from sliding rearwardly and out of the compartment 42.

A handle 68 is secured to the upper cross member 70. An additional cross member 72 is provided at the lower portion of the frame 8 forward of the cross member 48. A plurality of small, rectangular pockets 74 extend downwardly and laterally between the cross member 70 and cross member 48, separated by pocket walls 76. Each of the pockets 74 has a dimension and configuration sufficient to receive the handle end of a fish pole therein.

To use the carrying cart 2 in accordance with this invention, the battery 6 that powers the trolling motor 4 can be easily lifted high enough by either a man or a woman to be placed in the battery carrying compartment 42 that has been conveniently placed in the lowest part of the frame 8. The battery 6 is placed in the cart 2 first before the trolling motor 4, which when in place on the cart blocks the front entrance to the battery carrying compartment. The cylindrical motor housing 78 of the trolling motor is then easily lifted high enough to be seated in the arcuate cutout 52 of the motor support member 50, whereupon the control housing 58 and clamp assembly 60 can be pivoted upwardly and rearwardly to reach the clamp supporting member 62. The clamp assembly is then clamped to the clamp supporting member 62. The motor control assembly 66 extends above the clamp supporting member 62 when the trolling motor 4 has been clamped in place on the cart 2. Thus, when the battery 6 and trolling motor 4 have been fully placed in the cart 2 and secured thereon, the greatest weight comprising the battery 6 and motor housing 78 with the electric motor therein is at the lower portion of the cart. The clamp assembly 60 has somewhat less weight and is positioned about three-fourths of the way up the frame when loaded thereon, and the control assembly 66 is positioned at about the level of the upper cross member 70 or above. This distribution of weight when the trolling motor 4 and battery are loaded on to the cart 2 provides an easily controlled balance for both men and women workers to grasp the handle 68 at the level of the upper cross member 70 and tilt the cart 2 slightly rearward, then roll the cart forward on the wheels 18 and 20 to the customer's boat where the trolling motor and battery are to be installed. It is then relatively easy for both men and women workers to move the handle 68 forwardly to put the cart 2 back in its upright position, whereby the lower ends of the cross members 48 and 70 at the front of the cart 2 rest on the ground. At such time the upright frame members 22 and 24 are substantially vertical. The clamp assembly 60 can then be unclamped to free that portion of the trolling motor assembly from the cart, and the trolling motor may then be lifted a relatively short distance for the motor housing 78 to clear the arcuate cut-out 52 in which it had been seated, then moved away from the cart 2 where it can be allowed to rest on the ground temporarily or taken directly to the customer's boat for clamping thereon. The battery 6 may then be lifted from the battery carrying compartment 42 and allowed to rest on the ground until ready to place in the boat for electrical connection to the trolling motor 4. It can thus be seen that the cart 2 in accordance with this invention provides a well balanced carrying vehicle for transporting a relatively heavy trolling motor and battery from a rental shop or the like to the customer's boat, which can be readily loaded, safely secured on the cart, moved and unloaded by either men and women workers on a repeated basis throughout the work day.

The carrying cart 2 is pivotable rearwardly on said axle to a position wherein said battery in place in said battery receiving section and said motor housing in place in said motor housing receiving section are positioned above said axle with at least a portion of said battery being toward the rear of said axle and with at least a portion of said motor housing being toward the front of said axle to thereby substantially distribute the weight of said battery and of said motor housing over said axle to minimize any tendency of the said cart to pivot forwardly or rearwardly by virtue of the weight of said battery and of said motor housing carried on said cart. In other words, the carrying cart constructed in accordance with this invention provides a balanced carrying vehicle when transporting a trolling motor and battery carried thereon which does not have a tendency to pivot either forwardly or rearwardly because of the weight of the trolling motor and battery carried thereon.

We claim:

1. A carrying cart for a trolling motor and battery in combination with said trolling motor, said trolling motor including a motor housing, a transom clamping assembly and a motor control assembly, said cart comprising an elongated frame member extending upright having an upper end and a lower end, a wheel assembly below the lower end of said elongated frame member, a battery carrying compartment adjacent said lower end of said elongated frame member and above said wheel assembly, a motor housing receiving portion of said carrying cart located forwardly of said battery carrying compartment, a clamp support member extending outwardly and forwardly of said elongated frame member on which to clamp the transom clamping assembly of said trolling motor, said clamp support member being spaced apart and above said motor housing receiving portion a sufficient distance to more evenly distribute the combined weight of the trolling motor and battery from the lower end of the cart to the upper end thereof when said battery and trolling motor have been loaded thereon.

2. A carrying cart for a trolling motor and battery in combination with said trolling motor as set forth in claim 1, including a second elongated frame member extending upright having an upper end and a lower end, said second elongated frame member being laterally spaced apart from said first mentioned elongated frame member and each elongated frame member extending laterally inward toward each other along the rear edge of said battery carrying compartment to provide respective rear wall portions of said battery carrying compartment.

3. A carrying cart for a trolling motor and battery in combination with said trolling motor as set forth in claim 2, including an upper cross member extending laterally from said upper end of said first mentioned elongated frame member to said upper end of said second elongated frame member, and a hand grasp member on said upper cross member.

4. A carrying cart for a trolling motor and battery in combination with said trolling motor as set forth in claim 2, including a first longitudinal side frame member extending forward from said lower end of said first mentioned elongated frame member, a second longitudinal side frame member extending forward from said lower end of said second elongated frame member, wherein said battery carrying compartment includes a forward lateral edge, a first lower cross member extending laterally across from said first longitudinal side frame member to said second longitudinal side frame member along said forward lateral edge of said battery carrying compartment to form a forward wall thereof.

5. A carrying cart for a trolling motor and battery in combination with said trolling motor as set forth in claim 4, including a first reinforcing member extending from said first mentioned elongated frame member near said upper end thereof at a diagonal to said first longitudinal side frame member.

6. A carrying cart for a trolling motor and battery in combination with said trolling motor as set forth in claim 5, including a second reinforcing member extending from said second elongated frame member near said upper end thereof at a diagonal to said second longitudinal side frame member.

7. A carrying cart for a trolling motor and battery in combination with a trolling motor as set forth in claim 2, including a first lower cross member extending laterally across from a first longitudinal side frame member to said second longitudinal side frame member, a second lower cross member extending laterally across from said first longitudinal side frame member to said second longitudinal side frame member at a location spaced apart forwardly of said first lower cross member to define said motor housing receiving portion of said carrying cart.

8. A carrying cart for a trolling motor and battery in combination with said trolling motor as set forth in claim 7, including a third lower cross member extending laterally between said first longitudinal side frame member and said second longitudinal side frame member, said third lower cross member being spaced apart forward of said second lower cross member, and a plurality of receiving pockets between said second and third lower cross members.

9. A carrying cart for a trolling motor and battery in combination with said trolling motor as set forth in claim 8, wherein said second lower cross member extends downwardly to terminate at a lower edge, said lower edge of said second lower cross member reaching ground level when said longitudinal side frame members are substantially parallel to the ground.

10. A carrying cart for a trolling motor and battery in combination with said trolling motor as set forth in claim 8, wherein said third lower cross member extends downwardly to terminate at a lower edge, said lower edge of said third lower cross member reaching ground level when said longitudinal side frame members are substantially parallel to the ground.

11. A carrying cart for a trolling motor and battery in combination with said trolling motor as set forth in claim 7, including a motor support member extending longitudinally between said first lower cross member and said second lower cross member, said motor support member having an upwardly facing arcuate seating portion to receive said motor housing when said trolling motor is loaded on to said cart.

12. A carrying cart for a trolling motor and battery in combination with said trolling motor and battery, said trolling motor including a motor housing, a transom clamping assembly and a motor control assembly, said carrying cart including an upwardly extending elongated frame having an upper end and a lower end, a longitudinally extending support portion of said frame extending forwardly from said lower end of said upwardly extending elongated frame, a battery receiving section of said longitudinally extending support portion adjacent said lower end of said upwardly extending elongated frame, a motor housing receiving section of said longitudinally extending support portion forward of said battery receiving section, an axle extending laterally across said lower end of said upwardly extending elongated frame at a location adjacent said battery receiving section, at least one rotatable member mounted for rotation on said axle, said carrying cart being pivotable rearwardly on said axle to a position wherein said battery in place in said battery receiving section and said motor housing in place in said motor housing receiving section are positioned above said axle with at least a portion of said battery being toward the rear of said axle and with at least a portion of said motor housing being toward the front of said axle to thereby substantially distribute the weight of said battery and of said motor housing over said axle to minimize any tendency of said carrying cart to pivot forwardly or rearwardly by virtue of the weight of said battery and of said motor housing carried on said cart.

* * * * *